(No Model.)
E. RHODES.
STUFFING BOX.
No. 505,369.  Patented Sept. 19, 1893.
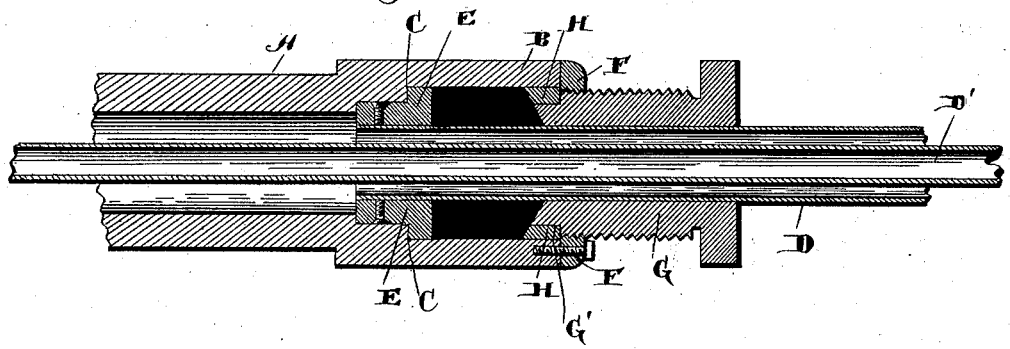
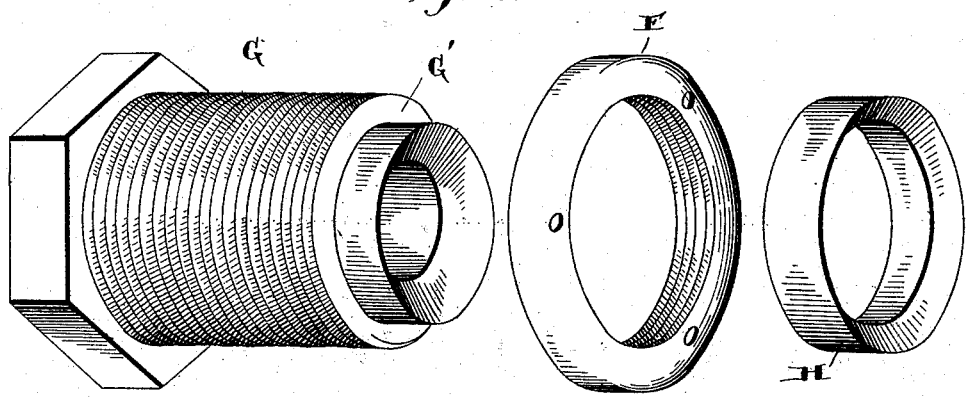
Witnesses
Geo. E. Frech.
Roland A. Fitzgerald.
Inventor
Edward Rhodes
By Lehmann Patterson & Kerr
attys.

UNITED STATES PATENT OFFICE.

EDWARD RHODES, OF PHILADELPHIA, PENNSYLVANIA, ASSIGNOR OF ONE-HALF TO JOHN MAYERS, OF SAME PLACE.

STUFFING-BOX.

SPECIFICATION forming part of Letters Patent No. 505,369, dated September 19, 1893.

Application filed May 13, 1893. Serial No. 474,109. (No model.)

*To all whom it may concern:*

Be it known that I, EDWARD RHODES, of Philadelphia, in the county of Philadelphia and State of Pennsylvania, have invented certain new and useful Improvements in Stuffing-Boxes; and I do hereby declare the following to be a full, clear, and exact description of the invention, such as will enable others skilled in the art to which it pertains to make and use it, reference being had to the accompanying drawings, which form part of this specification.

My invention relates to an improvement in stuffing boxes, and it consists in the novel manner of adjusting the follower within the box as will be fully described hereinafter and especially referred to in the claims.

The object of my invention is to provide an improved stuffing box which will be very effectual in its operation, which will not exert an unequal strain or pressure upon any part of the piping passing through it, and which may be adjusted if so desired while the object to which it is secured is rotating or in operation.

Referring to the accompanying drawings, Figure 1, is a longitudinal sectional view of my improved stuffing box. Fig. 2, is a perspective view of the parts detached.

A designates the box secured to and projecting from a revoluble body not shown having its outer end B enlarged to form the internal shoulder C.

D is a stationary pipe for conducting steam or other fluid or matter through the boxing having secured to its lower end the flanged collar E, which fits snugly within the portion B of the box, and rests upon shoulder C, as shown.

D' is a second pipe incased by pipe D for use when two fluids are to be conveyed separately through the box.

Removably secured to the outer end of the box is ring F, the opening of which is screw threaded and of slightly less diameter than the portion B of the box.

The follower G which is screw threaded upon its exterior as shown, is adapted to move longitudinally upon pipe D, and through the ring F which holds it in the desired adjustment, as will be readily understood. The inner end of the follower is reduced to form the annular shoulders G' and adapted to fit thereon is the follower ring H, which fits tightly the boxing. The packing is then arranged between the flanged collar F, and the lower end of the follower, which is compressed by the latter being run inward, thus preventing any possible leakage. The outer end of the follower is squared as shown, so that a wrench may be readily applied thereto for adjusting it. The opening in ring F is made of less diameter than box B, for the purpose of protecting the threads upon the follower from wear against the inner sides of the circular box. The said ring being secured in position by screws may be removed with ease when it is desired to withdraw the follower ring or pipe D. A further advantage afforded by the removable and contracted ring F, is that by its use it is unnecessary to form screw threads upon any portion of the box proper, the ring affording an equally secure hold for the follower whether it be projected its whole length into the box or merely started therein. The screw threads being on the interior, rather than on the exterior of the ring or box render them less liable to injury while at the same time the periphery of the box presents a smooth and finished appearance. By means of the screw threaded ring and follower, I secure an even movement of the latter, thus avoiding the tendency to twist out of line with the supply pipe passing therethrough, and exerting strain upon the latter which might cause it to crack or break.

This packing box may be used in connection with any body or object which is revoluble around a stationary inlet, and is especially adapted for rotary paper driers, and other machinery of similar kinds in this art.

Having thus described my invention, what I claim, and desire to secure by Letters Patent, is—

1. The combination of a packing box, a pipe extended thereinto, a collar arranged between the pipe and the box, a follower movable longitudinally on the said pipe and into the boxing, and a packing ring carried by the inner end of said follower, substantially as shown and described.

2. The combination of an interiorly screw (No Model.) 2 Sheets—Sheet 1.
E. R. ROBINSON.
ELECTRIC RAILWAY TROLLEY.
No. 505,370. Patented Sept. 19, 1893.
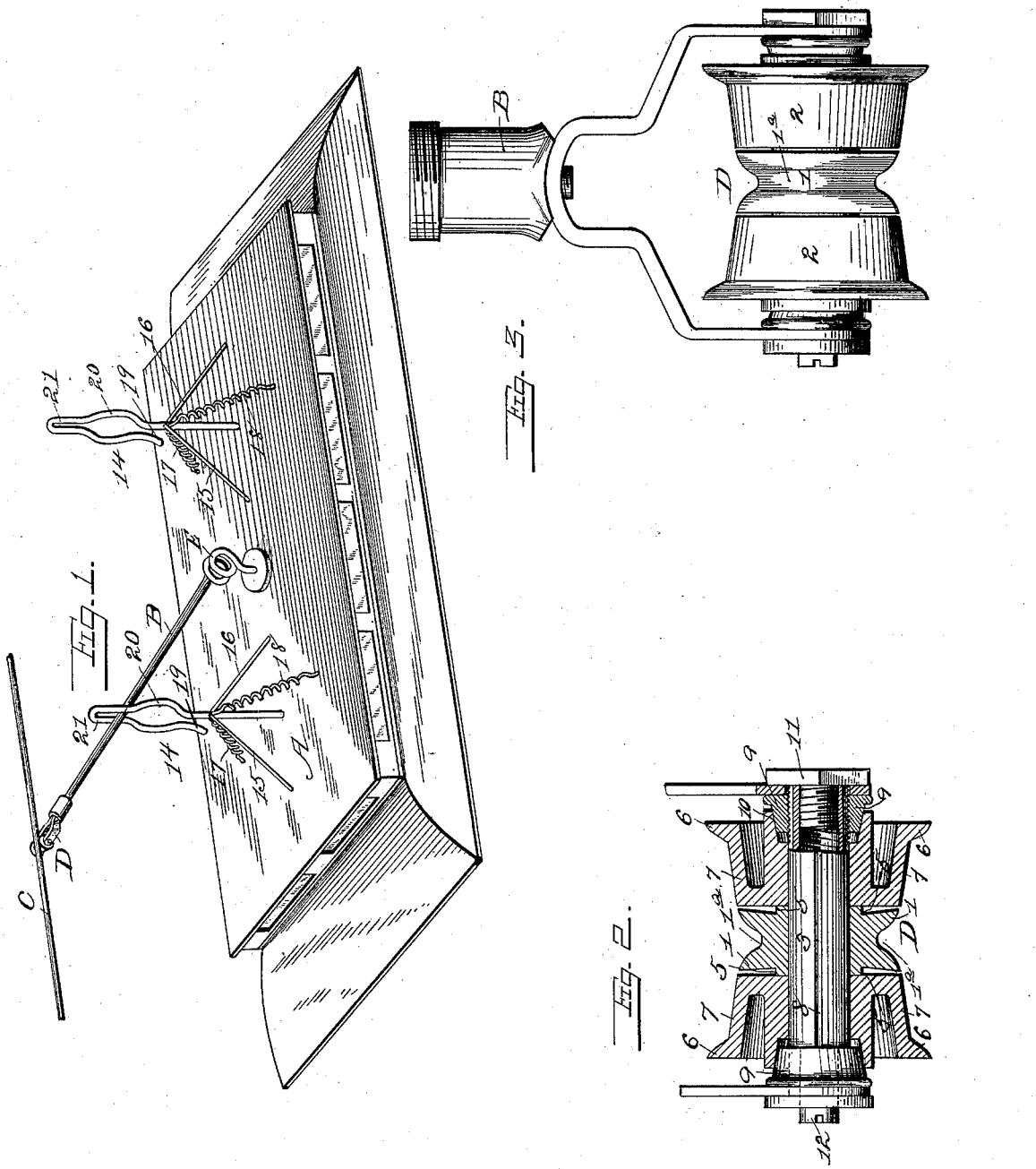
Attest:
Walter Iznariss,
Geo. E. Cruice.
Inventor:
E. R. Robinson
By Knight Bros.
Attorneys.